US010873532B2

(12) United States Patent
Chang et al.

(10) Patent No.: US 10,873,532 B2
(45) Date of Patent: Dec. 22, 2020

(54) FLOW CONTROL VISIBILITY

(71) Applicant: Barefoot Networks, Inc., Santa Clara, CA (US)

(72) Inventors: Remy Chang, Milpitas, CA (US); Anurag Agrawal, Santa Clara, CA (US); Yi Li, Fremont, CA (US); Michael Feng, Mountain View, CA (US); Yan Wang, Saratoga, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 16/108,661

(22) Filed: Aug. 22, 2018

(65) Prior Publication Data

US 2020/0044976 A1 Feb. 6, 2020

Related U.S. Application Data

(60) Provisional application No. 62/712,927, filed on Jul. 31, 2018.

(51) Int. Cl.
*H04L 12/26* (2006.01)
*H04L 12/851* (2013.01)
*H04L 12/841* (2013.01)
*H04L 12/935* (2013.01)
*H04L 12/861* (2013.01)
*H04L 12/741* (2013.01)

(52) U.S. Cl.
CPC .......... *H04L 47/2433* (2013.01); *H04L 45/74* (2013.01); *H04L 47/2441* (2013.01); *H04L 47/2483* (2013.01); *H04L 47/28* (2013.01); *H04L 49/3018* (2013.01); *H04L 49/3027* (2013.01); *H04L 49/3063* (2013.01); *H04L 49/90* (2013.01)

(58) Field of Classification Search
None
See application file for complete search history.

(56) References Cited

U.S. PATENT DOCUMENTS

| | | | |
|---|---|---|---|
| 9,961,022 B1 | 5/2018 | Kahn et al. | |
| 2005/0005021 A1 | 1/2005 | Grant et al. | |
| 2009/0055742 A1 | 2/2009 | Nordhagen | |
| 2009/0323526 A1* | 12/2009 | Pike | H04L 47/10 370/235 |
| 2011/0261687 A1 | 10/2011 | Armstrong et al. | |
| 2015/0016247 A1 | 1/2015 | Hayes et al. | |

(Continued)

OTHER PUBLICATIONS

Non-Published Commonly Owned International Patent Application PCT/US19/21459, filed Mar. 8, 2019, 28 pages, Barefoot Networks, Inc.

(Continued)

*Primary Examiner* — Zewdu A Beyen
(74) *Attorney, Agent, or Firm* — Compass IP Law PC

(57) ABSTRACT

Some embodiments provide a method for a traffic management circuit of a data plane forwarding circuit. The traffic management circuit receives data messages from a set of ingress pipelines and provides the data messages to a set of egress pipelines. The method identifies a flow control event. The method provides metadata regarding the flow control event to a message generation circuit of the data plane forwarding circuit via a bus between the traffic management circuit and the message generation circuit.

19 Claims, 6 Drawing Sheets

(56) References Cited

U.S. PATENT DOCUMENTS

2017/0083319 A1* 3/2017 Burger ................. G06F 11/3648
2017/0134497 A1* 5/2017 Harter ..................... H04L 67/12
2017/0339075 A1   11/2017 Arad

OTHER PUBLICATIONS

PCT International Search Report and Written Opinion of Commonly Owned International Patent Application PCT/US2019/021459, dated May 24, 2019, 10 pages, International Searching Authority (US).

* cited by examiner

FLOW CONTROL VISIBILITY

BACKGROUND

A network forwarding element uses priority flow control as a mechanism to prevent specific data flows from overloading the forwarding element's capacity. The overloaded forwarding element can send a flow control message to a link partner (another forwarding element) that indicates for the link partner to pause sending specific traffic (or to resume sending specific traffic that has previously been paused, once the congestion conditions have been cleared up. Similarly, the network forwarding element may receive flow control messages from its link partners that specify for the forwarding element to pause (or resume) sending specific traffic to that link partner. The use of flow control within a network may be indicative of traffic patterns within the network, but is not easy to track.

BRIEF SUMMARY

Some embodiments of the invention provide a data plane forwarding circuit that can be configured to track flow control events and provide information about the flow control events to a (local or remote) monitor. The data plane forwarding circuit of some embodiments includes configurable message processing stages configured to execute ingress and egress pipelines for processing data messages, as well as a traffic management circuit that (among other operations) functions as a crossbar to receive data messages from the ingress pipelines and provide the data messages to the correct egress pipelines. In some embodiments, the traffic management circuit is configured to identify flow control events and provide metadata regarding these flow control events to a data message generation circuit of the data plane forwarding circuit. This data message generation circuit, in some embodiments, stores the metadata and generates a data message including the metadata for the data plane forwarding circuit to transmit to a monitoring system.

In some embodiments, the data plane forwarding circuit processes data tuples associated with data messages received by the data plane in order to forward the data messages within the network. In some embodiments, the data plane is part of a network forwarding element (e.g., a switch, a router, etc.) that includes a control-plane circuit ("control plane") that configures the data plane. In some embodiments, the message processing stages, traffic management circuit, and/or data message generation circuit are configurable to process data messages and perform related operations (e.g., monitoring and reporting flow control events) by the control plane. In other embodiments, the control plane that configures the data plane forwarding circuit operates outside of the data plane's forwarding element (e.g., operates on a remote server). In some embodiments, the local control plane is implemented by a control software layer that is executed by one or more general purpose processors (e.g., CPUs) of the forwarding element, while a remote control plane is implemented by control software layer executing by one or more CPUs of another forwarding element or a remote computer (e.g., server).

The flow control events that the traffic management circuit detects can include the receipt of a flow control message at a link layer port of the forwarding element and/or the generation of a flow control message by the data plane forwarding circuit. When a link partner of the network forwarding element (i.e., another forwarding element with a link layer connection to the network forwarding element) is overly congested based at least partly on the receipt of data messages of a particular flow from the network forwarding element, the link partner sends a flow control message to the port of the network forwarding element requesting that the network forwarding element pause the sending of data messages with a particular priority (corresponding to the data flow causing congestion) to that port. Similarly, if the link partner has cleared its congestion, it may send a flow control message indicating that the network forwarding element can resume sending data messages with the specified priority to the link partner. These flow control messages are processed by the data plane forwarding circuit, which ceases or resumes sending these data messages as requested.

The traffic management circuit of some embodiments detects when the data plane forwarding circuit receives these flow control messages, and transmits metadata to the data message generation circuit about the flow control messages. In some embodiments, the traffic management circuit detects the receipt of a flow control message when that flow control message is passed from an ingress pipeline to the traffic management circuit. In other embodiments, the traffic management circuit receives a signal summarizing a received flow control message from the port at which the flow control message is received.

In addition, the traffic management circuit transmits metadata regarding a flow control event when the data plane forwarding circuit generates a flow control message to send to a link partner. In some embodiments, the traffic management circuit is configured to generate these flow control messages in response to detecting congestion in particular queues (which the traffic management circuit manages). In this case, the traffic management circuit has the information required to generate the metadata for the flow control event.

The metadata, in some embodiments, includes (i) a timestamp for the flow control event (generated by a circuit of the traffic management circuit), (ii) a receive/transmit indicator (e.g., a bit) that indicates whether the event is the receipt of a flow control message or generation and transmission of a flow control message, (iii) a port identifier that specifies the port at which the flow control message was received or through which the flow control message was sent, and (iv) the flow control message contents (e.g., the priority).

In some embodiments, the traffic management circuit can send metadata for one flow control event per clock cycle to the data message generation circuit via a bus from the traffic management circuit to the data message generation circuit. In case more than one flow control event occurs during a clock cycle, the traffic management circuit of some embodiments includes a queue that stores metadata for up to a particular number of flow control events. If use of the queue is required, the traffic management circuit transmits metadata for one flow control event per clock cycle until the queue is cleared.

As mentioned, the data message generation circuit of some embodiments stores the metadata received from the traffic management circuit. For example, in some embodiments, the data message generation circuit includes a buffer for storing the metadata. Upon the occurrence of a specific condition (e.g., the buffer filling up past a threshold, a particular amount of time elapsing, etc.), the data message generation circuit generates a data message including (i) a set of data message headers and (ii) at least a portion of the metadata stored in the buffer. In some embodiments, the data message headers are preconfigured and include a destination network address for a monitoring system (e.g., a remote monitoring server). The data message generation circuit provides this generated data message with the amalgamated metadata to one of the ingress pipelines in some embodiments, such that the data message is processed through the data plane forwarding circuit and transmitted to the monitoring system.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments of the invention provide a data plane forwarding circuit that can be configured to track flow control events and provide information about the flow control events to a (local or remote) monitor. The data plane forwarding circuit of some embodiments includes configurable message processing stages configured to execute ingress and egress pipelines for processing data messages, as well as a traffic management circuit that (among other operations) functions as a crossbar to receive data messages from the ingress pipelines and provide the data messages to the correct egress pipelines. In some embodiments, the traffic management circuit is configured to identify flow control events and provide metadata regarding these flow control events to a data message generation circuit of the data plane forwarding circuit. This data message generation circuit, in some embodiments, stores the metadata and generates a data message including the metadata for the data plane forwarding circuit to transmit to a monitoring system.

Figure 1:
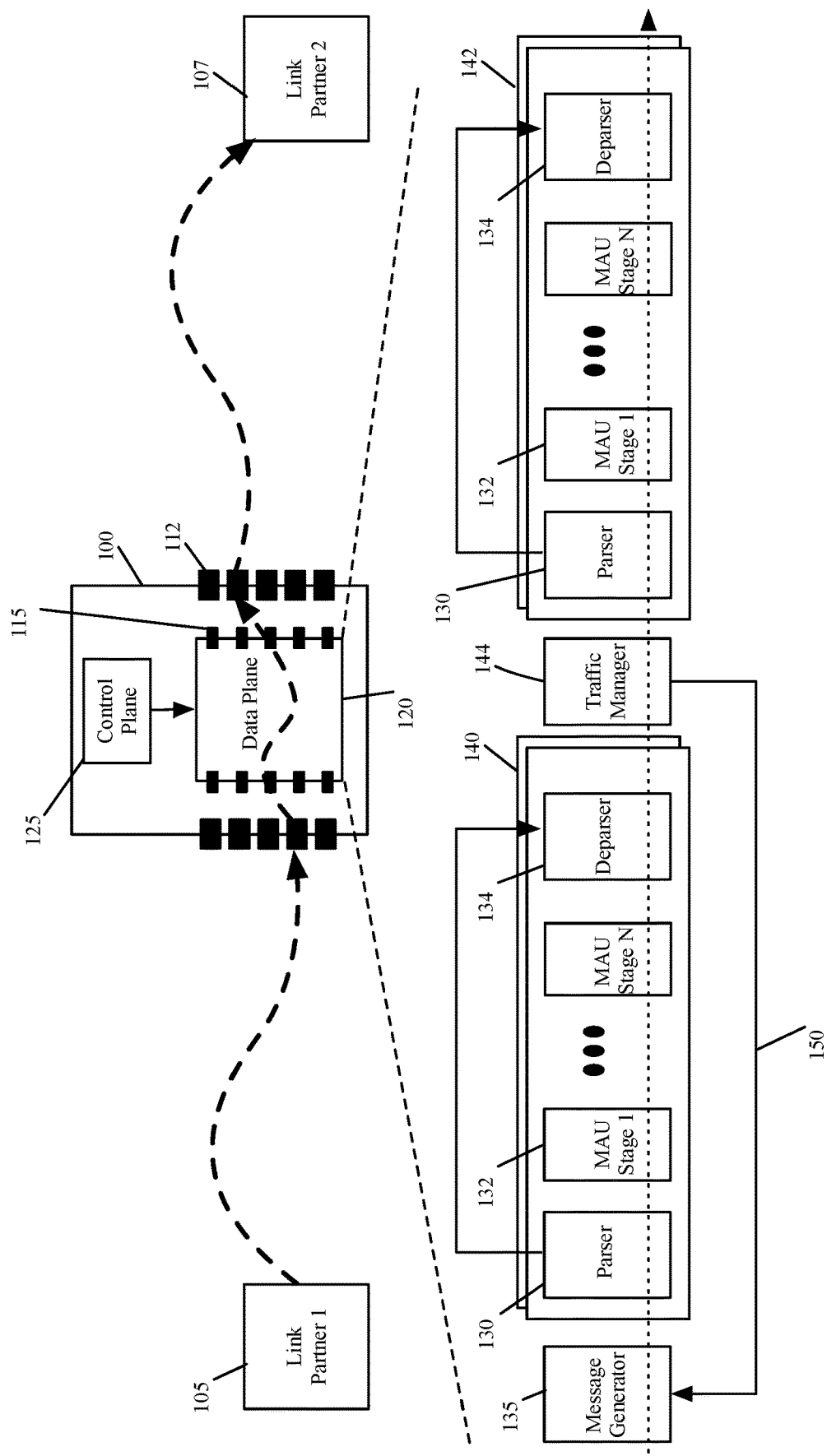
FIG. 1 conceptually illustrates an example of a network forwarding element that includes a data plane circuit that can be configured to track flow control events and provide information about these events to a monitor.

FIG. 1 conceptually illustrates an example of a network forwarding element 100 that includes such a data plane circuit 120 that can be configured to track flow control events and provide information about these events to a monitor. The forwarding element 100 forwards data messages within a network, and may be any type of forwarding element (e.g., a switch, a router, a bridge, etc.).

In FIG. 1, the forwarding element forwards data messages to and from at least two link partners 105 and 110 (the dashed arrow specifically shows a path for a data message from the first link partner 105 which is forwarded by the forwarding element 100 to the second link partner 110. The link partners 105 and 110 are connected to the forwarding element 100 at the link layer (layer 2 in the Open Systems Interconnect (OSI) model). These link partners are, e.g., other forwarding elements (i.e., either software forwarding elements or other hardware forwarding elements).

The forwarding element 100 may be deployed as an edge forwarding element at the edge of the network to connect to compute devices (e.g., standalone or host computers) that serve as sources and destinations of data messages within the network, or as a non-edge forwarding element to forward data messages between other forwarding elements in the network.

As shown, the forwarding element 100 includes (i) a data plane forwarding circuit 120 (the "data plane") that performs the forwarding operations of the forwarding element 100 to forward data messages received by the forwarding element to other devices, and (ii) a control plane circuit 125 (the "control plane") that configures the data plane circuit. The forwarding element 100 also includes physical ports 112 that receive data messages from and transmit data messages to the link partners 105 and 110 (as well as any other link partners of the forwarding element 100.

The control plane 125 configures the data plane 120 to process data messages and perform related operations (e.g., monitoring and reporting flow control events). In some embodiments, the control plane includes one or more processors (such as a microprocessor with multiple processing cores or units) that execute instructions and a memory that stores instructions for processes that when executed by the processors perform the control plane operations. These instructions can be specified by (i) a manufacturer of the network forwarding element that includes the control and data planes 125 and 120, (ii) a network administrator that deploys and maintains the network forwarding element, or (iii) one or more automated processes that execute on servers and/or network forwarding elements that monitor network conditions. The control plane processor, or another circuit of the control plane, communicates with the data plane (e.g., to configure the data plane or to receive statistics from the data plane) through the interface.

The data plane circuit 120 includes ports 115 that receive data messages to process and transmit data messages after they have been processed. In some embodiments, these ports 115 are link layer ports for which flow control messages are received and sent. Some ports 115 of the data plane 120 are associated with the physical ports 112 of the forwarding element 100, while other ports 115 are associated with other components of the data plane 120 in some embodiments. The data plane 120 also includes message generator circuits ("message generators") 135, multiple ingress pipelines 140, multiple egress pipelines 142, and a traffic management circuit ("traffic manager") 144. In some embodiments, the data plane 120 is implemented on an application specific integrated circuit (ASIC), and its components are defined on this integrated circuit.

The message generators 135 generate messages in the data plane. In some embodiments, these messages can direct circuits in the data plane to perform certain operations or to store data in the messages for export to the control plane or to another device through a network. In some embodiments, the message generators 135 generate data messages that are processed through the ingress and/or egress pipelines 140 and 142 and transmitted through the network to a device that monitors the forwarding element 100. For instance, in some embodiments the message generators 135 receive flow control event metadata and package this metadata into data messages that are sent through the network to a monitoring device.

The ingress and egress pipelines 140 and 142 process the data messages received by the forwarding element (and generated by the message generators 135) in order to forward these messages to their destinations in the network. The traffic manager 144 serves as a crossbar switch that directs messages from the ingress pipelines to egress pipelines. In addition, as shown, the data plane circuit 115 includes a bus 150 that provides data (e.g., flow control event metadata) from the traffic manager 144 to the message generators 135. The traffic manager of some embodiments is described in greater detail below by reference to FIG. 2.

Each ingress or egress pipeline includes several configurable (i.e., programmable) message-processing stages 132 that can be configured to perform the data-plane forwarding operations of the forwarding element 100 to process and forward data messages to their destinations. These message-processing stages perform these forwarding operations by processing data tuples (e.g., message headers) associated with data messages received by the data plane 120 in order to determine how to forward the messages. In some embodiments, though described as separate pipelines, the ingress and egress pipelines 140 and 142 actually execute simultaneously on the same message-processing resources of the data plane circuit 115. That is, each message-processing stage 132 can process one ingress pipeline data message and one egress pipeline data message in the same clock cycle in some embodiments.

In some embodiments, the message processing stages 132 are match-action units (MAUs), as shown in this example. The MAUs, in some embodiments, include match tables that store multiple records for matching with data tuples (e.g., message header values stored in header vectors that are passed from one MAU to the next) of the processed data messages. When a data message matches a match record, the MAU then performs an action specified by an action record associated with the identified match record (e.g., an action record that is identified by the identified match record).

In some embodiments, each MAU also includes a set of stateful arithmetic logic units (ALUs) that perform arithmetic operations based on parameters specified by the header vectors and/or the match tables. The stateful ALUs can store the result of their operations in stateful tables that they access and/or can write these results in the header vectors (e.g., directly, or by directing another action ALU to write these results in the header vectors) for other MAU stages to use in processing the data message.

In addition to the MAU stages 132, each ingress or egress pipeline 140 or 142 includes a parser 130 and a deparser 134. The parser 130 extracts message header values from a data message that the pipeline receives for processing. In some embodiments, the message header values are stored in a header vector that is passed to the first MAU stage (and then to subsequent MAU stages). The header vector is processed, and in some cases modified, by successive message processing stages 132 as part of their message processing operations. The parser 130 of a pipeline passes the payload of the message to the deparser 134 as the pipeline's message-processing stages 132 operate on the header vectors. In some embodiments, the parser passes the entire message rather than just the payload to the deparser 134.

When a pipeline finishes processing a data message and the message has to be provided to the traffic manager (in case of an ingress pipeline) or to a port 115 (in case of an egress pipeline), the deparser 134 of the pipeline reconstructs the data message (including any modifications to the message header values). In some embodiments, the deparser constructs the message header from the modified message header vector received from the last message-processing stage 132 and combines this with the payload (or a portion of the entire packet specified as the payload) received from the parser 130.

Figure 2:
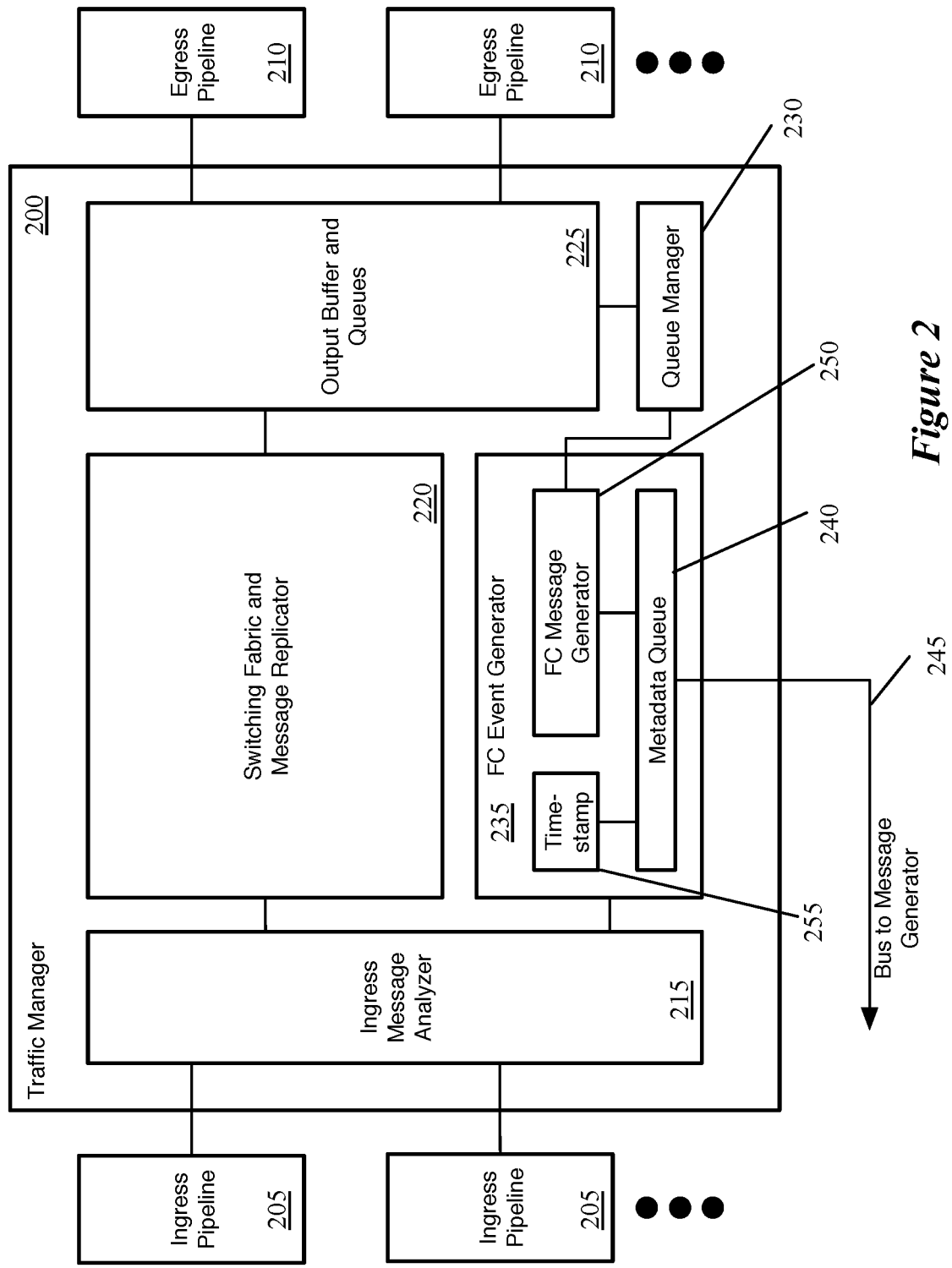
FIG. 2 conceptually illustrates a traffic manager of some embodiments.

FIG. 2 conceptually illustrates a traffic manager 200 of some embodiments. As mentioned, the traffic manager 200 receives reconstructed packets from ingress pipelines 205 and provides these packets to the appropriate egress pipelines 210. The traffic manager 200 of some embodiments includes an ingress message analyzer 215, switching fabric and message replicator 220, an output buffer and queues 225, a queue monitor 230, and a flow control event generator 235.

Upon receiving a data message from one of the ingress pipelines 205, the ingress message analyzer 215 determines how to process the data message. In some embodiments, the ingress pipeline 205 provides the traffic manager with the reconstructed data message as well as additional metadata, such as an egress queue for the data message, a multicast group identifier, etc. In some embodiments, the ingress pipelines 205 can also provide instructions to the traffic manager 200, such as modifying queue credits (which affects queue scheduling) and turning on or off certain queues (effectively performing flow control). In addition, the ingress pipelines may process flow control messages from link partners of the forwarding element and provide these flow control messages to the traffic manager 200 (so that the traffic manager can pause or resume the queue(s) specified by the flow control message).

The ingress message analyzer 215, in some embodiments, analyzes this metadata provided by the ingress pipeline 205 with the data message to determine how the traffic manager 200 will process the data message. For example, if the metadata includes a multicast group identifier, this information is provided with the data message to the switching fabric and message replicator 220. In addition, if a flow control message is received, the ingress message analyzer 215 provides this information to the flow control event generator 235.

The switching fabric and message replicator 220 of some embodiments handles the addition of the data messages to the appropriate queue(s) 225. In some embodiments, for unicast packets, the ingress pipeline identifies a specific queue, and the switching fabric 220 adds the message to this queue. In some embodiments, the data message is actually added to the output buffer 225, and a reference to the location in the output buffer at which the data message is stored is added to the queue. In addition, if the data message is a multicast message, the switching fabric and message replicator 220 uses the multicast group identifier determined by the ingress pipeline to determine the multiple queues 225 to which to add the data message. In some embodiments, the switching fabric and message replicator 220 also selects among groups of output queues (e.g., queues corresponding to equal-cost multi-path routing paths or within a link aggregate group).

The output buffer and queues 225, as mentioned, store the data messages until they are dequeued and provided to an egress pipeline 210. In some embodiments, a scheduler determines the order in which the data messages are dequeued for each egress pipeline 210 (no more than one data message is dequeued to each pipeline during each clock cycle), based on the priorities of the data messages in the different queues as well as other factors.

The queue monitor 230 monitors statistics of each of the output queues 225 in some embodiments. This includes queue depth (i.e., the number of data messages and/or bytes currently stored in a queue) as well as other queue statistics. In some embodiments, the queue monitor 230 determines when the queue depth of certain queues have passed various thresholds, and sends signals to the ingress and/or egress pipelines regarding the queue statistics. In addition, when the queue monitor 230 detects that a particular queue has passed a threshold congestion level (i.e., the queue depth passes a specific threshold), the queue monitor sends a message regarding this queue to the flow control event generator 235, so that the flow control event generator can (i) generate and transmit a flow control message for that queue and (ii) store metadata regarding this flow control event.

The flow control event generator 235 detects flow control events, stores metadata about these events in a queue 240, and transmits this metadata to one or more of the message generators (i.e., the message generator 135 of the data plane circuit 120) via a bus 245. As shown, the flow control event generator 235 of some embodiments includes a flow control message generator 250, a timestamp generator 255, and the aforementioned metadata queue 240. The operations of the flow control event generator will be described by reference to FIGS. 3 and 4.

Figure 3:
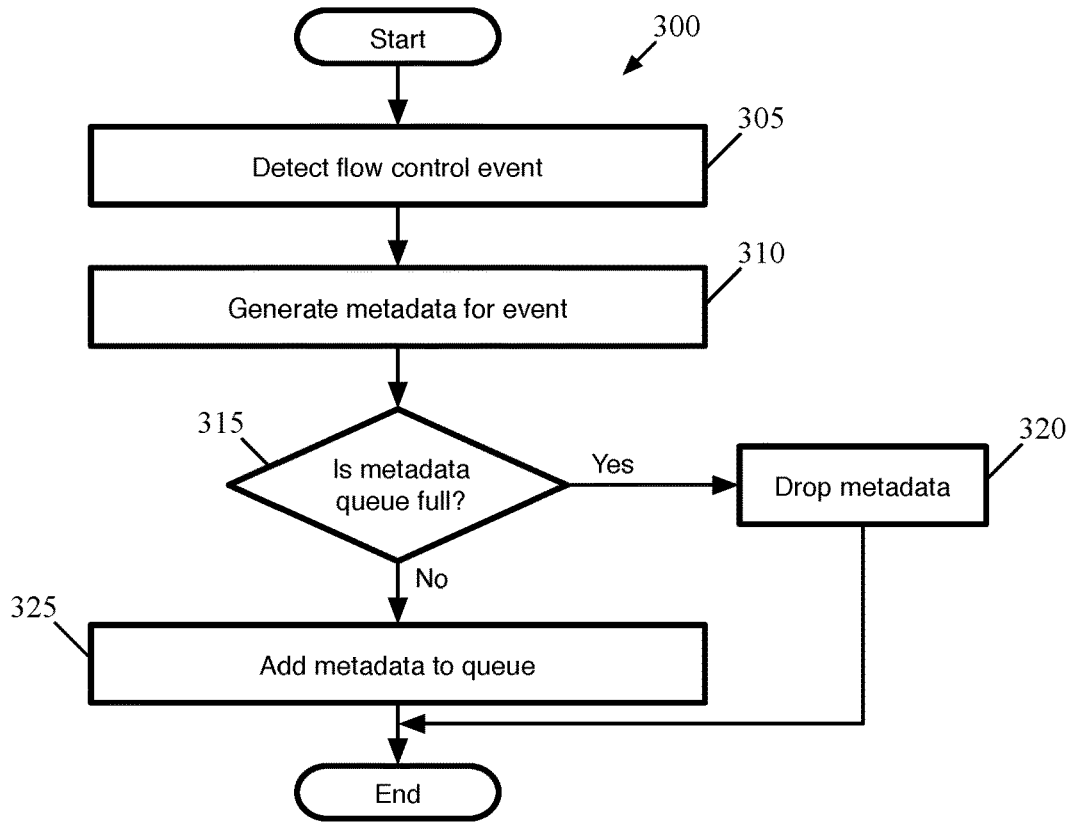
FIG. 3 conceptually illustrates a process of some embodiments for storing flow control event metadata in a queue.

FIG. 3 conceptually illustrates a process 300 of some embodiments for storing flow control event metadata in a queue. In some embodiments, components of the flow control event generator 235 perform the process 300. As shown, the process 300 begins by detecting (at 305) a flow control event. These flow control events can include the receipt of a flow control message at a link layer port of the forwarding element and/or the generation of a flow control message by the data plane forwarding circuit.

When a link partner of the forwarding element is overly congested based at least partly on the receipt of data messages from the forwarding element that belong to a particular data flow, the link partner sends a flow control message to the port of the network forwarding element requesting that the network forwarding element pause the sending of data messages with a particular priority (e.g., corresponding to the data flow causing congestion) to that port. Similarly, if the link partner has cleared its congestion, it may send a flow control message indicating that the network forwarding element can resume sending data messages with the specified priority to the link partner. These flow control messages are provided to the traffic manager 200, which modifies the queue scheduler as requested by the link partner to pause or resume sending data messages from the specified queue.

In addition, the flow control event generator 235 receives the flow control message, or at least metadata indicating the content of the flow control message. In some embodiments, the flow control message is passed from one of the ingress pipelines 205 to the traffic manager (e.g., to the ingress message analyzer 215, which provides the data to the flow control event generator 235). In other embodiments, the flow control event generator 235 receives a signal summarizing a received flow control message directly from the link layer port at which the flow control message was received by the data plane.

The network forwarding element (i.e., the data plane) also generates flow control messages to send to a link partner, which the flow control event generator 235 also detects as a flow control event. In some embodiments, the traffic manager 200 (e.g., the flow control message generator 250) is configured to generate these flow control messages in response to the detection of congestion in particular queues.

Returning to FIG. 3, the process 300 generates (at 310) metadata for the detected flow control event. In some embodiments, the generated metadata for a flow control event includes (i) a timestamp for the flow control event (generated by the timestamp generator 255), (ii) an identification as to whether the flow control event is a received flow control message or a transmitted flow control message (e.g., a single bit), (iii) a port identifier that specifies the link layer port at which the flow control message was received or through which the flow control message was sent, and (iv) the flow control message contents (e.g., the flow priority or priorities being paused or resumed, the pause time, and any other data). For received flow control messages, in some embodiments the metadata is based on the message as received from the link layer port or ingress pipeline. For flow control messages transmitted by the forwarding element, this metadata is determined based on the data used by flow control message generator 250 to generate the message.

Next, the process 300 determines (at 315) whether the metadata queue is full. In some embodiments, as shown in FIG. 2, the flow control event generator includes a FIFO queue for storing flow control events. Because multiple flow control messages may be received and/or generated in the same clock cycle, in some embodiments a queue 240 is used to store metadata for these messages before transmitting the metadata to the message generator. For instance, this queue can hold metadata for eight, sixteen, etc. flow control events in different embodiments.

If the metadata queue is full (e.g., because a larger number of flow control messages have been received and/or transmitted recently), then the process drops (at 320) the metadata (i.e., does not store the data). However, if there is room left in the metadata queue, then the process 300 adds (at 325) metadata for the detected flow control event to the queue.

Figure 4:
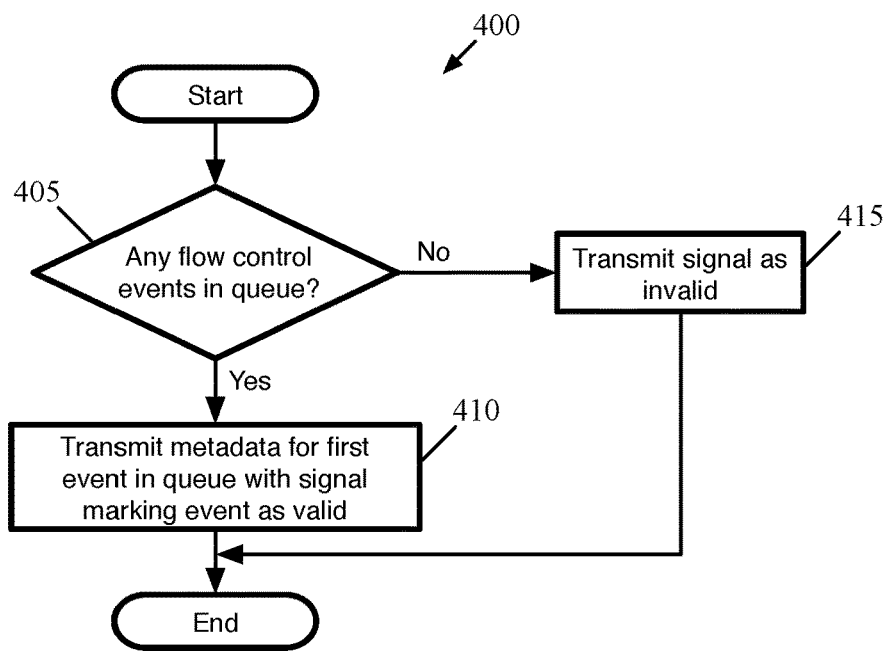
FIG. 4 conceptually illustrates a process of some embodiments performed by the traffic manager each clock cycle of the data plane circuit to transmit flow control event metadata to a message generator.

In some embodiments, the flow control event generator 235 transmits metadata for one flow control event per clock cycle from the metadata queue 240 to the message generator via the bus 245. FIG. 4 conceptually illustrates a process 400 of some embodiments performed by the traffic manager (e.g., by the flow control event generator) each clock cycle of the data plane circuit to transmit flow control event metadata to a message generator. As shown, the process 400 begins by determining (at 405) whether the metadata for any flow control events is stored in the metadata queue.

If the queue contains metadata for at least one flow control event, then the process 400 transmits (at 410) metadata for the first (oldest) event in the queue with a signal marking the event as valid. However, if there is no metadata stored in the queue, then the process transmits (at 415) a signal to the message generator that is specified as invalid. That is, each clock cycle, the traffic manager transmits a signal via the bus to the message generator. However, if there is no metadata to transmit, then a validity bit is set to 0 in some embodiments, so that the message generator does not store the signal as flow control metadata.

Figure 5:
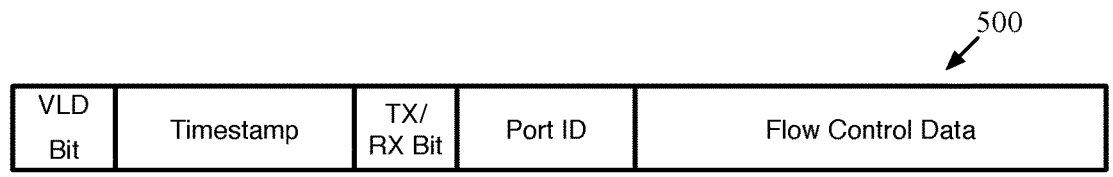
FIG. 5 conceptually illustrates the data that is transmitted in some embodiments over the bus from the traffic manager to the message generator.

FIG. 5 conceptually illustrates the data 500 that is transmitted in some embodiments over the bus from the traffic manager 200 to the message generator. As shown, the data 500 includes a validity bit, a timestamp, a transmit/receive bit, a port identifier, and flow control data. The validity bit, in some embodiments, is a single bit that identifies whether the signal is valid flow control metadata. The timestamp indicates the time that the flow control event was detected (i.e., the time that a flow control message was received by the forwarding element or generated by the forwarding element). The transmit/receive bit, in some embodiments, is a single bit that indicates whether the event represents a transmitted flow control message or a received flow control message. The port identifier specifies the link layer port of the data plane circuit at which the flow control message was received or through which the flow control message was transmitted. Lastly, the flow control event data, in some embodiments, indicates the data contained in the flow control message (e.g., the priority affected, whether to pause or resume that priority, and the length of time for which to pause that priority).

As mentioned, the metadata from the traffic manager is transmitted to one or more of the message generators of the data plane circuit. The message generator of some embodiments stores the metadata received from the traffic management circuit (e.g., in a buffer or set of buffers), and upon occurrence of a specific condition generates data messages including data message headers and at least a portion of the metadata stored in the buffer. The message generator transmits these generated data messages to a processing pipeline of the data plane (e.g., the ingress pipeline) so that the data message will be processed by the data plane and transmitted through the network to a monitor.

Figure 6:
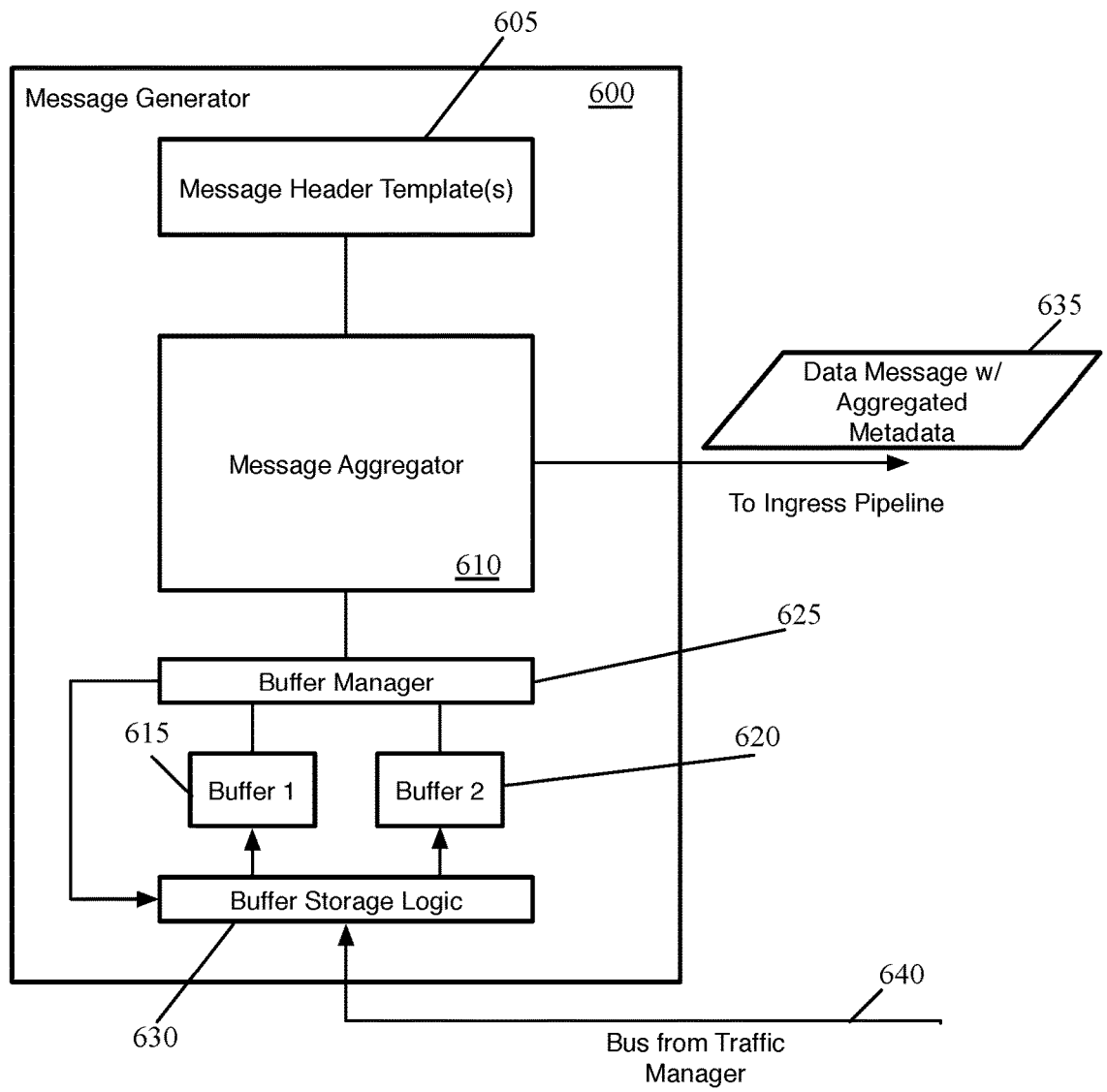
FIG. 6 conceptually illustrates a message generator of some embodiments.

FIG. 6 conceptually illustrates a message generator 600 of some embodiments. As described above, the traffic manager 600 generates data and/or control messages that are sent to the ingress and/or egress pipelines. These messages may be generated in response to the receipt of certain signals (e.g., to send a particular type of control message), in response to the occurrence of certain conditions, etc. As shown, the message generator 600 includes at least a set of message header templates 605, a message aggregator 610, a pair of buffers 615 and 620, a buffer manager 625, and buffer storage logic 630.

The message header templates 605 are configured message headers (e.g., stored in RAM) that are used by the message aggregator 610 to generate data and/or control messages. For instance, for certain types of messages (e.g., bidirectional forwarding detection heartbeat messages), the entire message might be stored in the message header template. For other types of messages that package runtime data into a message, the message aggregator 610 combines this runtime data with a set of message headers from the templates 605. For instance, to generate a data message with flow control event metadata, the message aggregator 610 retrieves data from one of the buffers 615 or 620 and appends a set of message headers to this data that direct the data message 635 to a monitoring device.

The buffer manager 625 of some embodiments manages the buffers 615 and 620 as well as the buffer storage logic 630. In some embodiments, the buffer storage logic 630 receives flow control event metadata from the traffic manager via the bus 640 and determines (i) whether to store the received metadata in one of the buffers 615 and 620 and (ii) in which of these buffers to store the metadata (if it should be stored). The first decision (whether to store the metadata at all) is determined by the validity bit that is transmitted with the metadata signal from the traffic manager. If this bit indicates that the metadata signal is valid data, then the buffer storage logic 630 stores the data in one of the buffers 615 and 620. Which buffer to use is based on a signal from the buffer manager 625 in some embodiments. Specifically, the buffer manager specifies for the buffer storage logic 630 to store received data into one of the buffers 615 or 620 until that buffer is read into a data message by the message aggregator 610. At that point, the buffer manager 625 specifies for the buffer storage logic 630 to direct incoming metadata to the other of the buffers 615 and 620. It should be understood that other mechanisms or circuit structures may be used for buffering flow control event metadata and generating data messages to transmit that metadata to a local or remote monitor.

Figure 7:
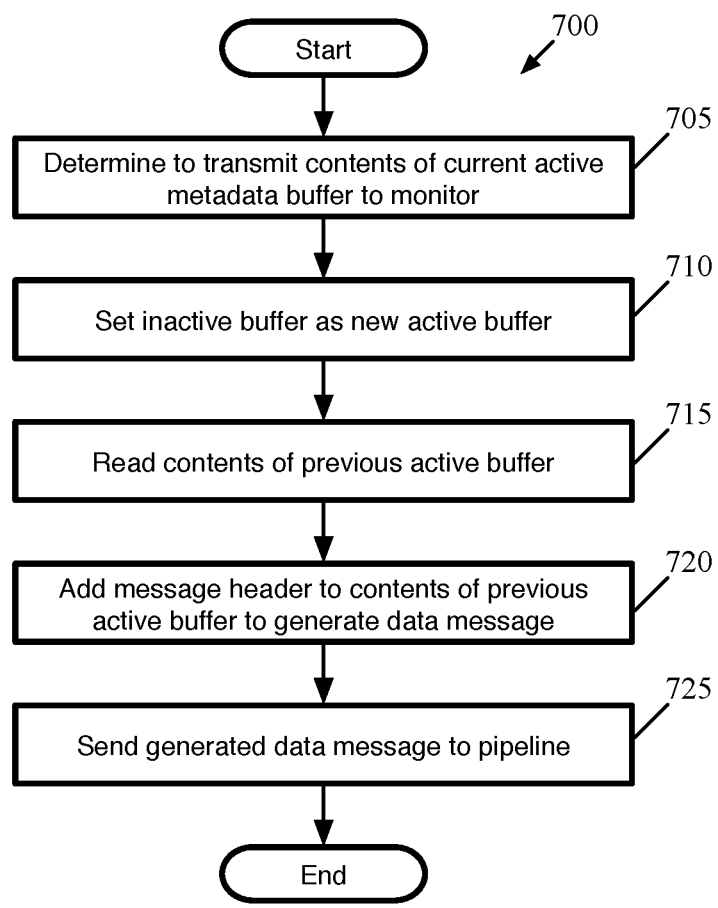
FIG. 7 conceptually illustrates a process of some embodiments for generating a data message based on flow control event metadata received from the traffic manager.

FIG. 7 conceptually illustrates a process 700 of some embodiments for generating a data message based on flow control event metadata received from the traffic manager (or from other sources, in different embodiments). The process 700 is performed by a message generator (e.g., the message generator 600 or a similar circuit). In this example, the process uses two buffers for storing the flow control event metadata, though as mentioned other embodiments may use only a single storage.

As shown, the process 700 determines (at 705) to transmit the contents of a currently active metadata buffer to a monitor. In some embodiments, the message generator 600 is configured to transmit the contents of the flow control event metadata buffer when that buffer reaches a threshold capacity, after a particular period of time (or whichever of these occurs first), or based on other occurrences.

Based on this determination, the process sets (at 710) the currently inactive buffer as the new active buffer. In some embodiments, the buffer manager 625 sends a different signal to the buffer storage logic 630 so that the buffer storage logic will store subsequently received metadata in the other buffer (i.e., the buffer that is currently empty). The process also reads (at 715) the contents of the previous active buffer (i.e., the buffer that had been storing flow control event metadata received from the traffic manager). This use of multiple buffers allows the message generator (e.g., the buffer manager 625 or message aggregator 610) to read from one of the buffers while newly received metadata can be stored in a different buffer without affecting the read operations.

Next, the process adds (at 720) a message header to the contents read from the previous active buffer in order to generate a data message. In some embodiments, this message header is preconfigured for all data messages containing flow control event metadata, and is stored by the message generator as a message header template 605. Each time the contents of one of the buffers 615 and 620 is read, the message aggregator 610 adds this message header to those contents (or to a subset of the contents, if multiple data messages are sent for the contents of one buffer) to generate a data message.

The process then sends (at 725) the generated data message to a pipeline of the data plane. The process then ends. In some embodiments, the message generators always send data messages to the ingress pipeline (as though the data message was received at a port of the data plane), while other embodiments send some of the generated data messages to the traffic manager for delivery directly to an egress pipeline. These data messages are processed by the data plane and, in some embodiments, transmitted by the network forwarding element to a destination monitoring device through the intervening network. In other embodiments, the data messages are sent to a local monitor (e.g., on the data plane circuit or the processor that runs the control plane).

Figure 8:
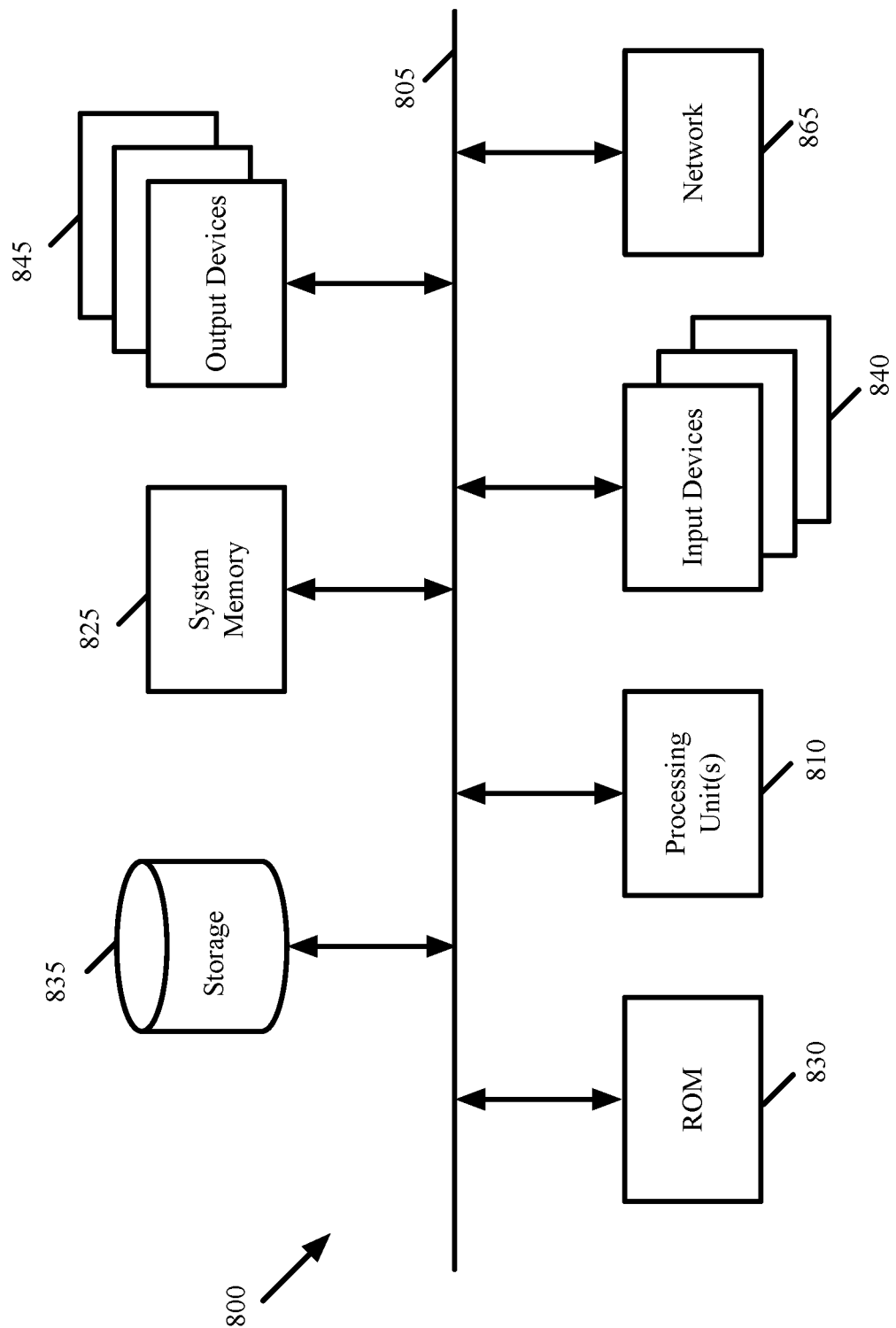
FIG. 8 conceptually illustrates an electronic system with which some embodiments of the invention are implemented.

FIG. 8 conceptually illustrates an electronic system 800 with which some embodiments of the invention are implemented. The electronic system 800 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the electronic system 800. For instance, the bus 805 communicatively connects the processing unit(s) 810 with the read-only memory 830, the system memory 825, and the permanent storage device 835. From these various memory units, the processing unit(s) 810 retrieves instructions to execute and data to process in order to execute the processes of the invention. The processing unit(s) may be a single processor or a multi-core processor in different embodiments.

The read-only-memory (ROM) 830 stores static data and instructions that are needed by the processing unit(s) 810 and other modules of the electronic system. The permanent storage device 835, on the other hand, is a read-and-write memory device. This device is a non-volatile memory unit that stores instructions and data even when the electronic system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such as a random-access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieves instructions to execute and data to process in order to execute the processes of some embodiments.

The bus 805 also connects to the input and output devices 840 and 845. The input devices enable the user to communicate information and select commands to the electronic system. The input devices 840 include alphanumeric keyboards and pointing devices (also called "cursor control devices"). The output devices 845 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples electronic system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of electronic system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 3, 4, and 7) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A method comprising:
at a traffic management circuit of a network forwarding integrated circuit (IC), identifying a flow control event, wherein the traffic management circuit receives data messages from a set of ingress pipelines and provides the data messages to a set of egress pipelines;

providing metadata regarding the flow control event to a message generation circuit of the network forwarding IC via a connection between the traffic management circuit and the message generation circuit, wherein the metadata comprises (i) indication whether the flow control event corresponds to receipt of a flow control message at the network forwarding IC or generation of a flow control message at the network forwarding IC and (ii) a port identifier that specifies the port at which a flow control message was received or through which a flow control message was sent;

the message generation circuit generating a data message, the data message including (i) a data message header and (ii) metadata for at least one flow control event; and transmitting the generated data message to a remote server for analysis.

2. The method of claim 1, wherein the message generation circuit stores the metadata in a buffer with metadata for a plurality of flow control events.

3. The method of claim 2, wherein the message generation circuit provides the generated data message to one of the ingress pipelines.

4. The method of claim 3, comprising: including an address of the remote server in the generated data message.

5. The method of claim 1, wherein the flow control event comprises receipt of a flow control message from a separate forwarding element instructing the network forwarding IC to either stop or resume sending data messages having a particular set of characteristics to the separate forwarding element.

6. The method of claim 5, wherein the flow control message is received at a particular port of the network forwarding IC and the particular set of characteristics comprises a priority value.

7. The method of claim 1, wherein the flow control event comprises generation of a flow control message by the traffic management circuit to instruct a separate forwarding element to either stop or resume sending data messages having a particular set of characteristics to the network forwarding IC.

8. The method of claim 7, wherein the particular set of characteristics comprises a priority value.

9. The method of claim 1, wherein the traffic management circuit transmits metadata for one flow control event per clock cycle of the network forwarding IC.

10. The method of claim 1, wherein the traffic management circuit comprises a queue for storing metadata regarding flow control events prior to transmitting the metadata to a packet generation circuit.

11. A data plane circuit of a network forwarding element for forwarding data messages within a network, the data plane circuit comprising:

a set of ingress pipelines;

a set of egress pipelines;

a message generation circuit; and a traffic management circuit to receive data messages from the set of ingress pipelines and to provide the data messages to the set of egress pipelines, wherein the traffic management circuit (i) is to identify a flow control event and (ii) is to provide metadata regarding the flow control event to the message generation circuit via a connection, wherein the metadata comprises: (a) indication whether the flow control event corresponds to receipt of a flow control message at the network forwarding element or generation of a flow control message at the network forwarding element and (b) a port identifier that specifies the port at which a flow control message was received or through which a flow control message was sent;

the message generation circuit to generate a data message for transmission to a remote monitoring system, the data message including (i) a data message header and (n) metadata for at east one flow control event; and an egress pipeline of the set of egress pipelines to cause transmission of the data message to the remote monitoring system.

12. The data plane circuit of claim 11, wherein the message generation circuit is to store the metadata in a buffer with metadata for a plurality of flow control events.

13. The data plane circuit of claim 12, wherein the message generation circuit is to provide the generated data message to one of the set of ingress pipelines.

14. The data plane circuit of claim 13, wherein the message generation circuit is to include an address of the remote monitoring system in the generated data message.

15. The data plane circuit of claim 11, wherein the flow control event comprises receipt of a flow control message from a separate forwarding element instructing the data plane circuit to either stop or resume sending data messages having a particular set of characteristics to the separate forwarding element.

16. The data plane circuit of claim 15, wherein the flow control message is received at a particular port and the particular set of characteristics comprises a priority value.

17. The data plane circuit of claim 11, wherein the flow control event comprises generation of a flow control message by the traffic management circuit to instruct a separate forwarding element to either stop or resume sending data messages having a particular set of characteristics to the data plane circuit.

18. The data plane circuit of claim 11, wherein the traffic management circuit is to transmit metadata for one flow control event per clock cycle.

19. The data plane circuit of claim 11, wherein the traffic management circuit comprises a queue to store metadata regarding flow control events prior to transmission of the metadata to a packet generation circuit.

* * * * *